UNITED STATES PATENT OFFICE 1,938,066

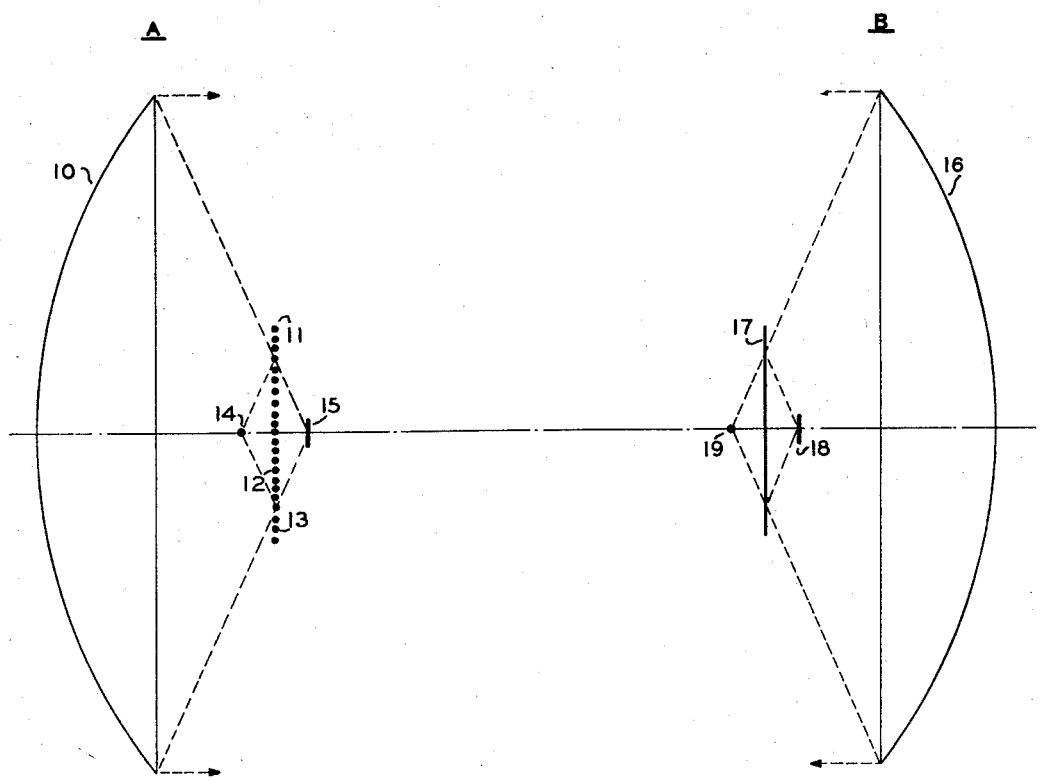

SCREEN GRATING FOR THE SIMULTANEOUS TWO - DIRECTIONAL TRANSMISSION OF ULTRA-SHORT WAVES

René H. Darbord, Paris, France, assignor to International Communications Laboratories, Inc., New York, N. Y., a corporation of New York Application July 10, 1931. Serial No. 549,928

9 Claims. (Cl. 250—11)

This invention relates generally to ultra-short wave systems and more particularly to means for reducing the number of reflectors required for the purposes of transmission and reception.

Heretofore it has been necessary to use different reflectors for transmission and reception. As the cost of reflectors is high in comparison with the other elements of an ultra-short wave system, it is desirable, for economical reasons, to reduce the number of reflectors required.

The principal object of the present invention is to provide means for utilizing a single reflector for both the transmission and reception.

Another object is to provide two-channel transmission in one direction between a transmitting and a receiving point by the use of a single reflector located at each of these points.

In carrying out the above-mentioned objects, a screen grating is properly disposed between the two elements associated with each reflector and the planes of polarization of the several elements are suitably crossed. With this arrangement, the screen grating prevents interference between the two elements associated with each of the reflectors, and thus permits two-channel communication to be carried on simultaneously by the use of only two reflectors, instead of the ordinary four reflectors, located at distant points. The elimination of interference between the two elements associated with each reflector depends upon a unique property of the screen grating; namely, that the screen grating acts as a plane reflector for ultra-short waves having their electrical field parallel to the direction of the wires in the grating and offers no obstacle to waves having their electrical field perpendicular to the direction of these wires.

One of the principal features of the invention is the use of a parallel wire grating for separating two simultaneously incident polarized waves having their planes of polarization inclined with respect to each other.

Another feature is the use of a parallel wire grating in combination with a reflector for superposing optically, but not physically, the elements placed on either side of the screen grating.

Another feature is the use of a parallel wire grating in combination with a reflector for superposing optically, but not physically, the transmitting and receiving elements placed on either side of the screen grating.

A further feature is the use of a parallel wire grating in combination with a reflector for superposing optically, but not physically, either two transmitting or two receiving elements placed on either side of the screen grating.

Other features will appear from a consideration of the following detailed description, taken in connection with the accompanying drawing, as well as from the appended claims.

A preferred embodiment of the invention is shown in the drawing which illustrates schematically the arrangement of the reflectors and associated elements for purposes of transmission and reception between two distant points. A and B represent two stations located at remote points. At station A is shown a reflector 10 having a transmitting element 14 placed at its object focus and a receiving element 15 placed at its principal focus. As the term "principal focus" is used in its ordinary sense, it is necessary to define only the term "object focus". The object focus may be defined as that point on the axis of the reflector at which a source of oscillations may be placed and a virtual image of the source formed at the principal focus of the reflector when a screen grating is suitably disposed between the source and the principal focus. Disposed between the transmitting element and the receiving element is a screen grating 11 having a plurality of parallel wires, as 12 and 13, which are suitably fastened to a rectangular insulating frame (not shown). The direction of the parallel wires 12, 13, etc. of the screen grating is such that these wires are parallel to the electrical field of waves radiating from the transmitting element 14 and are perpendicular to the electrical field of the waves adapted to be received by the receiving element 15.

At station B is shown a reflector 16 and a transmitting element 18 at the object focus and a receiving element 19 at the principal focus of this reflector. Disposed between the transmitting element 18 and the receiving element 19 is a parallel wire screen grating 17, similar in construction to screen grating 11. The direction of the parallel wires of the screen grating 17 is parallel to the electrical field of the waves transmitted by transmitting element 18 and is perpendicular to the electrical field of the waves adapted to be received by the receiving element 19.

The reflectors 10 and 16 may be parabolic reflectors, lenses, etc., and, in fact, may be any optical elements capable of co-operating with the screen gratings 11 and 17, in a manner to be described below, to superpose optically, but not physically, the elements comprising the transmitting and receiving antennæ.

The transmitting elements 14 and 18 may be doublets or any other suitable source of high frequency oscillations, while the receiving elements 15 and 19 may also be doublets or any other suitable receivers for high frequency oscillations.

It is also desirable to place a spherical mirror (not shown) about each of the receiving elements 13 and 19. The efficiency of these elements will be increased if they are placed at the centers of their associated spherical mirrors.

The screen gratings 11 and 17, as previously mentioned, have the property of acting as a plane reflector for ultra-short waves having their electrical field parallel to the direction of the wires in the grating, and of offering no obstacle to waves having their electrical field perpendicular to the direction of the parallel wires. The above-described action of the screen grating with respect to the polarizing wave is analogous to the action of a Nicol prism with respect to light waves. In order to distinguish the grating from others that do not have the same properties, it therefore seems appropriate to term such a grating "a polarizing grating". It may be noted that there is a difference in principle between the polarizing grating herein-mentioned and zone plates. In the case of zone plates the width of the spacing between the rings is of an order of magnitude comparable to the wave-length of ultra-short waves. In the case of the polarizing grating, the wires or rods employed have a diameter that is small in respect to the wave-length of ultra-short waves, while the spacing between the wires is likewise small in comparison to that wave-length. Furthermore, as a zone plate does not have the property that the plane of polarization of incident waves determines whether the waves shall be reflected or shall be transmitted, this difference is a plain indication that the principles underlying zone plates and polarizing gratings are dissimilar.

The size and position of the polarizing gratings themselves are determined by the following considerations. The optical field of these gratings must be at least as large as the optical field of the reflectors 10 and 16. On the other hand, it has been found that the reflectors 10 and 16 are most efficient when their principal foci are in the aperture plane. Obviously, these two conditions cannot be satisfied simultaneously, but, since the latter condition is not essential, a suitable compromise between them can be made. This compromise consists in constructing the reflectors so that their principal foci are outside of their aperture planes and in placing the polarizing gratings 11 and 17 inside of the principal foci of these reflectors, but in a position where the optical field of the polarizing gratings is greater than the optical field of their associated reflectors. It is to be understood, however, that the dimensions of the polarizing gratings should not be too large; for otherwise, after radiations have been transmitted from the reflectors 10 and 16, an undue proportion of these radiations will be reflected by the gratings with a consequent loss of field strength at a distance along the axes of the reflectors.

It is not necessary that the relation of the polarizing gratings 11 and 17 to the axes of the reflectors 10 and 16 be the same as is illustrated in the drawing. In this figure, the polarizing gratings are shown perpendicular to the axes of the reflectors. This is the simplest arrangement, but it is evident that the gratings might be inclined with respect to these axes, provided that the transmitting element 14 and the receiving element 15, as well as the transmitting element 18 and the receiving element 19, remain symmetrical with respect to the plane of their respective polarizing gratings. Likewise, the direction of the parallel wires in the polarizing gratings 11 and 17 is not necessarily that shown in the drawing. For example, the direction of the wires in the grating 11 might be parallel, instead of perpendicular, to the direction of the wires in grating 17. In fact, the only essential condition is that the direction of the parallel wires in each of the polarizing gratings be such that communication may be carried on between corresponding transmitting and receiving elements, without interference between the elements mentioned and the other elements associated with each of the reflectors. It is apparent that the direction of the parallel wires with respect to one another can be variously modified and this condition yet be satisfied.

It is likewise obvious that the arrangements of the transmitting and receiving elements shown in the drawing may be modified without departing from the spirit of the present invention. For example, at station A the receiving element 15 associated with reflector 10 might be replaced by a transmitting element, and the transmitting element 18 associated with reflector 16 might be replaced by a receiving element. Thus, two-channel transmission might take place between stations A and B by the use of only two reflectors.

Similarly, other arrangements of the receiving and transmitting elements, with respect to the direction of the wires in the polarizing grating, might be made.

The operation of the above system will be described briefly. As the waves radiating from the transmitting element 14 have their electrical field parallel to the direction of the wire, as 12 and 13, of the polarizing grating 14, that grating will act as a plane reflector and the waves will be reflected against the reflector 10. A virtual image of the transmitting element 14, somewhat distorted by diffraction, will appear to be located at the receiving element 15. Consequently, as was previously stated, these elements will be optically, though not physically, superposed. The waves are, in turn, transmitted by reflector 10 along lines parallel to its axis to reflector 16 at station B. Since these waves, when arriving at station B, have their electrical field perpendicular to the direction of the wires in the polarizing grating 17, they are readily focused by reflector 16, without interference from polarizing grating 17, at the receiving element 19 located at the principal focus.

In a similar manner, and for the same reasons, waves radiated by transmitting element 18 at station B are focused at receiving element 15 at station A, without interference from polarizing grating 11. It is evident, therefore, that the polarizing gratings 11 and 17 permit a single reflector at each station A and B to be used for both transmission and reception.

The above description has been made merely for the purpose of exemplifying one embodiment of the invention. It is, of course, evident that the principle of polarizing gratings may have many other applications, and the present invention is intended to extend to such other uses, except insofar as such extension is precluded by the appended claims.

What is claimed is:

1. In an ultrashort wave system, the combination of a reflector having a principal and an object focus, a transmitting antenna element placed at one focus and a receiving antenna element placed at the other focus, and a polarizing grating disposed between said elements.

2. In an ultrashort wave system, the combination of a reflector having a principal and an object focus, a transmitting antenna element placed at one focus, a receiving antenna element placed at the other focus, a polarizing grating disposed between said elements, said grating comprising a plurality of parallel wires having diameters small in comparison with the length of ultrashort waves and said wires being spaced from one another at distances likewise small in comparison with said wave lengths.

3. In an ultrashort wave system, the combination of a reflector having a principal and an object focus, a transmitting antenna element placed at one focus, a receiving antenna element placed at the other focus, and a polarizing grating comprising a plurality of parallel wires disposed between said elements in such a way that the direction of said wires is parallel to one antenna element and is perpendicular to the other antenna element.

4. In an ultrashort wave system, the combination of a reflector having a principal and an object focus, a transmitting antenna element placed at one focus, a receiving antenna element placed at the other focus and a polarizing grating, equal in extent to at least the focal area of said reflector, disposed between said elements.

5. In ultra-short wave systems, the combination of a reflector, a transmitting element placed at the object focus and a receiving element placed at the principal focus of said reflector, a polarizing grating suitably disposed between said elements, said grating comprising a plurality of parallel wires, the direction of said wires being parallel to the electrical field of waves radiated from said transmitting element and perpendicular to the electrical field of waves adapted to be received by said receiving element.

6. In an ultra-short wave system providing simultaneous two-channel communication without interference between said channels, the combination of two spatially disposed reflectors each having an object and a principal focus, a transmitting antenna element placed at one focus and a receiving antenna element placed at the other focus of each reflector, and a polarizing grating disposed between the antennæ elements of each reflector, said grating comprising a plurality of parallel wires which have diameters small in comparison with the length of ultra-short waves and which are spaced from one another at distances likewise small in comparison with said wavelength.

7. In ultra-short wave systems, the combination of a reflector, a transmitting element placed at the principal focus and a receiving element placed at the object focus of said reflector, a polarizing grating disposed between said antennæ elements, said grating comprising a plurality of parallel wires having their direction substantially perpendicular to the electrical field of waves radiated from said transmitting element and substantially parallel to the electrical field of waves adapted to be received by said receiving element.

8. In an ultra-short wave system, the combination of a reflector having a principal and an object focus, separate antennæ elements for simultaneous transmission and reception, respectively, each placed at one of said foci, and a polarizing grating, disposed between said antennæ elements and co-operating with said reflector for preventing interference between said antennæ elements by optically superposing said elements.

9. In an ultra-short wave system, the combination of a reflector having a principal and an object focus, an antenna element at each focus and disposed normal to the axis of the reflector and normal one to the other, and a polarized grating disposed between said elements and comprising a plurality of wires extending in a direction parallel to one antenna element and normal to the other.

RENÉ H. DARBORD.